United States Patent [19]

Hishinuma et al.

[11] Patent Number: 4,796,661
[45] Date of Patent: Jan. 10, 1989

[54] PROPORTIONAL ELECTRO-HYDRAULIC PRESSURE CONTROL VALVE

[75] Inventors: Yasuo Hishinuma, Yokohama; Hiroshi Ito, Kanagawa, both of Japan

[73] Assignee: Yuken Kogyo Kabushiki Kaisha, Fujisawa, Japan

[21] Appl. No.: 898,041

[22] Filed: Aug. 19, 1986

[30] Foreign Application Priority Data

| Aug. 30, 1985 | [JP] | Japan | 60-131723[U] |
| Aug. 30, 1985 | [JP] | Japan | 60-131724[U] |
| Aug. 30, 1985 | [JP] | Japan | 60-131726[U] |
| Mar. 20, 1986 | [JP] | Japan | 61-39935[U] |

[51] Int. Cl.$^4$ .................................................. F16K 31/02
[52] U.S. Cl. .................................. 137/487.5; 137/557; 251/129.08; 73/726; 165/80.3; 361/383
[58] Field of Search ........................ 137/487.5, 557; 251/129.04, 129.08; 73/726; 165/80 B; 361/383

[56] References Cited

U.S. PATENT DOCUMENTS

| 3,308,846 | 3/1967 | Yuile | 137/487.5 |
| 3,552,428 | 1/1971 | Pemberton | 137/487.5 X |
| 3,890,992 | 6/1975 | Wolz et al. | 137/487.5 |
| 4,253,480 | 3/1981 | Kessel et al. | 137/487.5 |
| 4,399,836 | 8/1983 | de Versterre et al. | 137/487.5 |
| 4,413,684 | 11/1983 | Walters et al. | 137/487.5 X |
| 4,488,574 | 12/1984 | Bartholomaus | 137/487.5 |
| 4,489,749 | 12/1984 | Buschor et al. | 137/487.5 |
| 4,520,657 | 6/1985 | Marthaler | 73/726 |
| 4,557,225 | 12/1985 | Sagues et al. | 165/80.3 X |
| 4,587,593 | 5/1986 | Liautaud et al. | 361/383 |
| 4,620,263 | 10/1986 | Ito | 361/383 |

FOREIGN PATENT DOCUMENTS

| 91984 | 6/1983 | Japan | 137/487.5 |

*Primary Examiner*—John Rivell
*Attorney, Agent, or Firm*—Fleit, Jacobson, Cohn & Price

[57] ABSTRACT

A proportional electro-hydraulic pressure control valve incorporates a pressure sensor in its valve body and the hydraulic fluid pressure in a pressure detecting fluid path provided in the valve body is delivered as an electric signal output by the pressure sensor. The pressure detecting fluid path is connected to a hydraulic fluid inlet port directly or through a restrictor or alternately the fluid path is connected to a pressure detecting port separated from both of the hydraulic fluid inlet port and a hydraulic fluid outlet port. The electric signal output from the pressure sensor is utilized to provide a numerical display of the controlled pressure or to effect the feedback control of a solenoid drive current through a closed loop.

15 Claims, 5 Drawing Sheets

PROPORTIONAL ELECTRO-HYDRAULIC PRESSURE CONTROL VALVE

BACKGROUND OF THE INVENTION

1. Field of the Invention

The present invention relates to a proportional electro-hydraulic pressure control valve.

2. Description of the Prior Art

In the past, when measuring the line pressure or the like in a hydraulic system, it has been necessary to mount a pressure gage by a suitable pipe arrangement and directly read the indicated pressure. In this case, while no difficulty will be caused by the operation of the pipe arrangement, etc., if the necessary measures have been contemplated intentionally at the beginning of the formation of the system, in other circumstances the additional piping operation requires the investiment of additional equipment cost and operational cost. Moreover, in cases involving the use of a Bourdon pressure gage, its life has been unavoidably reduced by the surge pressure in the system and also the reduction in reliability and the occurrence of reading errors have been inevitable. Moreover, the similar inconveniences have been caused by the arrangement of a pressure detector for various control purposes.

Also, with the conventional proportional electro-hydraulic pilot relief valves and the like, the valve is used in an open-loop control which is not included in an electric feedback loop and therefore its performance is naturally limited from the structural reason of the valve, etc. For example, its repeatability and reproducibility of the hysteresis characteristics are infallibly varied due to variation in the sliding resistance of the valve and also the improvement in the response waveform of the valve to the step input is limited even if the geometrical shape of the valve and the time constant of the proportional solenoid are changed. Thus, as the usual practice in such a case, it is conceivable to perform a closed-loop control or a control which involves the mechanical parts of the valve in the feedback control loop and effect a gain adjustment, phase lag-lead compensation or the like with the aid of an electronic force thereby improving the performance. However, the construction of a closed-loop control circuit must be so large in consideration of the arrangement of a pressure detector, the wiring for its output signal, etc.

SUMMARY OF THE INVENTION

It is the primary object of the present invention to provide a proportional electro-hydraulic pressure control valve with a pressure sensor, which overcomes the foregoing deficiencies in the prior art, eliminates the need to provide a pressure measuring pipe arrangement, eliminates the need for a pressure gage mounting space and simplifies considerably the construction of a closed-loop control circuit.

In accordance with one aspect of the invention, the foregoing deficiencies in the prior art are overcome by an improved proportional electro-hydraulic pressure control valve comprising a valve body including a hydraulic fluid inlet port, a hydraulic fluid outlet port and valve means positioned between the inlet and outlet ports to control the pressure at the inlet port, proportional plunger means for causing a force proportional to an input current for setting the control pressure to act on the valve means, a pressure detecting fluid path provided in the valve body, and a pressure sensor incorporated in the valve body to detect the hydraulic fluid pressure in the pressure detecting fluid path and output it as an electric signal.

In an embodiment of the invention, the pressure detecting fluid path is connected directly to the hydraulic fluid inlet port. In a modified embodiment, the valve body is formed with a pressure detecting port communicating with the pressure detecting fluid path and the pressure detecting fluid path is separated from both of the hydraulic fluid inlet and outlet ports. In another modified embodiment, there is provided an orifice communicating with the pressure detecting fluid path and the pressure detecting fluid path and the hydraulic fluid inlet port are communicated with each other with an opening limited by the orifice.

The pressure sensor may preferably be a semiconductor gage type pressure sensor and in the case of the relief valve, for example, the pressure sensor effects the detection of the main pressure by detecting the hydraulic fluid pressure in the pressure detecting fluid path communicating with the hydraulic fluid inlet port. The output of the pressure sensor is used as a pressure measuring signal input to a pressure indicator or control device. For example, an indicator for the digital indication of a pressure value in response to the output of the pressure sensor may be mounted on the electric equipment box of the valve.

By incorporating the small pressure sensor in the valve body, it is possible to electrically deliver a controlling pressure signal output from the valve itself to the outside, with the result that the lead wires required for this purpose can be connected, along for example with the lead wires for the solenoid coil, etc., to the terminals in the electric equipment box mounted fixedly on the plunger means and it is also possible to accommodate in the electric equipment box a power amplifier for controlling the input current to the plunger means or arrange the pressure indicator on the electric equipment box. Thus, there is no need to perform any external wiring and piping operations for pressure controlling and measuring purposes and no pressure gage mounting space is required.

In accordance with the invention, the provision of the separate pressure detecting port in the valve body allows the pressure sensor incorporated in the valve body to detect the pressure value of the hydraulic fluid reaching the port and moreover the separation of the pressure detecting fluid path from the hydraulic fluid inlet port of the valve means allows the valve of the invention to separately form a closed-loop control circuit with utilizes the detected pressure value as a feedback signal. It is also possible to monitor the output of the pressure sensor or apply it to a digital indicator to indicate the pressure value in the form of digits. Also, where the pressure detecting fluid path and the hydraulic fluid inlet port are communicated with the limited opening by the orifice formed in the plug separating them from each other, by using for example the valve of the invention as a pilot valve of a balanced piston type relief valve, it is possible to accomplish a unique closed-loop control by these valves.

In accordance with another aspect of the invention, with a view to making possible the construction of a closed-loop control circuit by a valve itself in relation with the previously mentioned construction, there is provided a proportional electro-hydraulic pressure control valve comprising a valve body including a hydraulic fluid inlet port, a hydraulic fluid outlet port, main valve means forming pressure control means in between the two ports and pilot valve means for controlling a pilot pressure acting on the main valve means, proportional plunger means for applying to the pilot valve means a force proportional to the input current for setting the pilot pressure, a power amplifier for controlling the input current to the plunger means, a pressure detecting fluid path provided in the valve body so as to introduce thereinto the hydraulic fluid having a pressure controlled by the main valve means, a pressure sensor for detecting the hydraulic fluid pressure in the pressure detecting fluid path within the valve body to generate an electric signal, and a feedback circuit for comparing the output signal of the pressure sensor with an externally applied command signal to generate a loop difference signal and input it to the power amplifier.

In this case, the valve itself forms a closed-loop control system utilizing the pressure detection value detected by the pressure sensor within the valve body as a feed-back signal and including from the electric signal input end to the hydraulic pressure output end of the valve. Thus, in the actual use, it is only necessary to apply the command signal from external setting means and the control accuracy of the hydraulic system can be improved by the valve itself. Also, the desired valve mounting structure, etc., can be realized in substantially the same size and shape as the conventional valve for closed-loop control circuits and there is no need for the provision of any special pressure detecting pipe arrangement within the system. Further, it is possible to output from the external terminal a fault predicting diagnostic alarm signal for the control valve in accordance with the output of the integral pressure sensor and also it is possible to provide a fail-safe function by the use of the loop difference signal.

The above and other objects as well as advantageous features of this invention will be better understood and will become more apparent with reference to the following detailed description considered in conjunction with the accompanying drawings.

DESCRIPTION OF THE PREFERRED EMBODIMENTS

Figure 1:
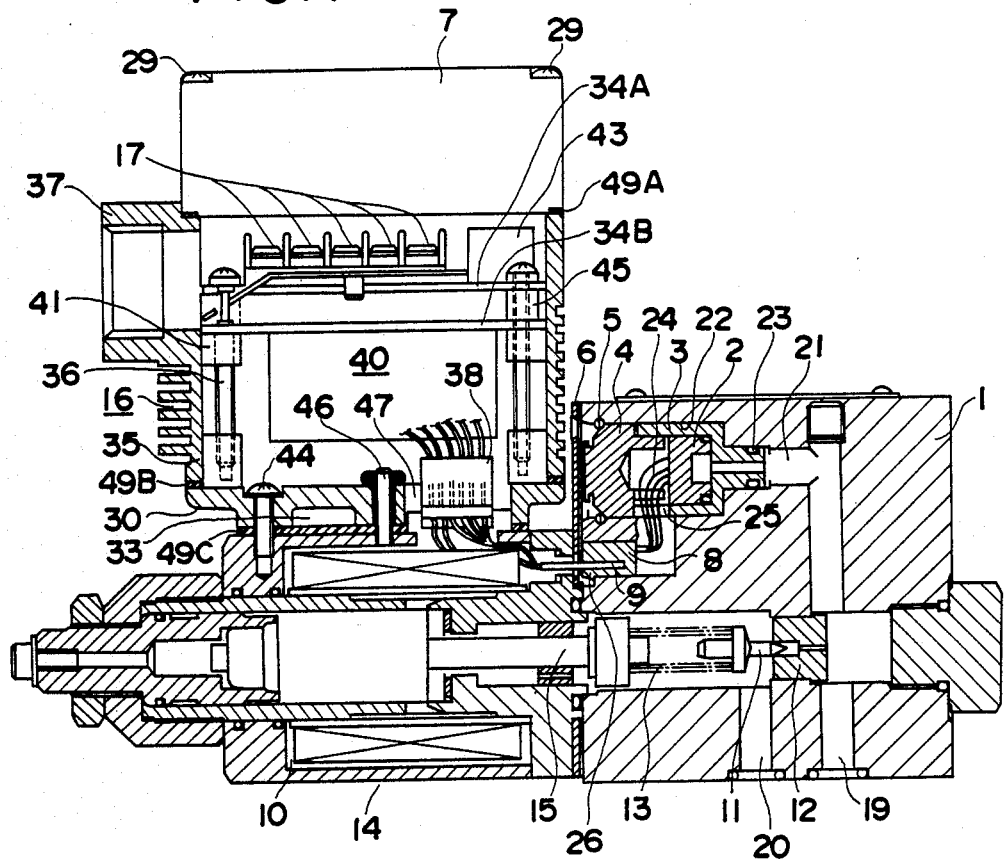
FIG. 1 is a longitudinal sectional view showing a first embodiment of the invention.
Figure 2:
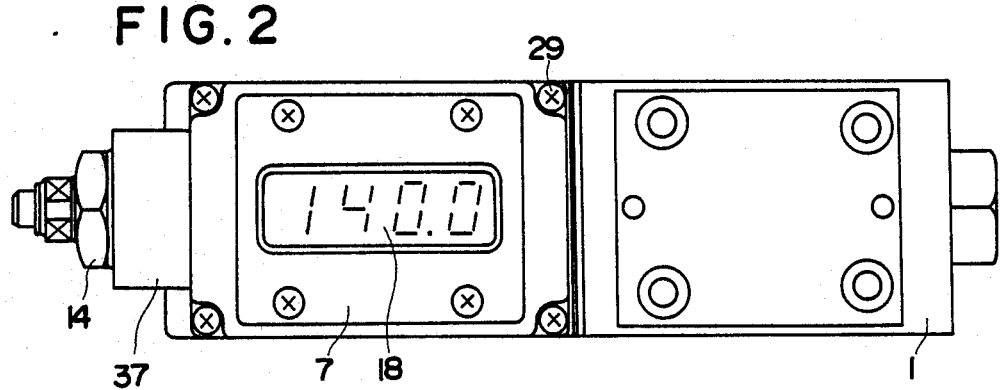
FIG. 2 is a plan view of FIG. 1.

FIGS. 1 and 2 show respectively a longitudinal sectional view and plan view of a first embodiment of the invention. The illustrated embodiment comprises a proportional electro-hydraulic relief valve in which a poppet 11 is driven and pressed against a seat 12 in a valve body 1 by a movable plunger 15 of proportional electro-hydraulic solenoid plunger 14 through a spring 13.

An electric equipment box 16 with a built-in amplifier is mounted on the upper part of the solenoid plunger 14 and the box 16 includes various terminals 17 arranged in its inner upper parts, a digital indicator 7 mounted above the terminals 17 to serve as a cover for the box 16 and a digital indicating section 18 arranged on the upper surface of the indicator 7.

The valve body 1 is formed with hydraulic fluid inlet and outlet ports 19 and 20 and also formed inside the valve body 1 is a pressure detecting fluid path 21 which is communicated with the hydraulic fluid inlet port 19 and opened to a sensor receiving hole 22. A sensor holder 3 incorporating a semiconductor gage type pressure sensor 2 is inserted through an O-ring seal into the sensor receiving hole 22 and the pressure sensing portion of the pressure sensor 2 is positioned so as to be exposed to the fluid path 21. The holder 3 is positioned and fixed from behind by a plug 4 and a snap 5 between them and the innermost wall of the receiving hole 22 and at the same time it prevents the sensor assembly from slipping out of its position under the action of the hydraulic pressure. Also, the sensor holder 3 and the plug 4 are respectively formed with notches 24 and 25 to accommodate the signal lead wires from the pressure sensor 2 within the valve body 1. To ensure alignment between the notches 24 and 25, the attachment of the plug 4 to the valve body 1 is made by the snap ring 5 which permits rotation of the plug 4. A connector 8 is preliminarily fastened to the forward ends of the signal lead wires from the pressure sensor 2 and the connector 8 is fixed in its lengthwise direction by it lower projection 26 which is pressed against the valve body 1 by a press steel sheet 6. The connector 8 is fixed vertically by the hole inner walls of the valve body 1 and it is fixed laterally (in the vertical direction to the paper plane of the drawing) by pressing the cut and turned-up portions of the steel sheet 6 against the outer sides of the connector 8.

With this construction, the hydraulic fluid flowing into the hydraulic fluid inlet port 19 is set to a given pressure by the poppet 11 and it is also delivered to the pressure detecting portion (diaphragm) of the pressure sensor 2 through the pressure detecting fluid path 21 thereby converting the strain of the gage to an electric signal and outputting it. The signal from the pressure sensor 2 is supplied through the connector 8 and an attachment pin 9 molded integrally with a solenoid coil 10 into the electric equipment box 16 so that the signal is transmitted to a particular one of the terminals 17 and the indicator 7. The indicator 7 receives the output signal of the pressure sensor 2 and indicates it in digital form on an indicating window 18.

In accordance with this embodiment, the incorporation of the small pressure sensor 2 in the valve body 1 and the provision of the indicator 7 has the effect of providing the valve with a pressure indicating function and providing an indication in the form of digits thus making its reading very easy. Also, by virtue of the provision of the pressure signal output terminal 17 for delivering the pressure detection signal from the pressure sensor 2 to the outside, this pressure detection signal can be utilized to provide an external indication as well as for various control purposes. Also, the accommodation of the pressure sensor 2 in the sensor holder 3 makes easy the insertion and mounting and demounting of the pressure sensor 2 and the arrangement of the small connector 8 between the valve body 1 and the plunger means 14 for delivering the signal from the pressure sensor 2 has the effect of not only making the maintenance easy but also internally arranging the wiring leads so as to prevent their exposure to the outside thereby accomplishing prevention of the occurrence of troubles such as breaking of the leads and improvement of the external appearance.

Figure 3:
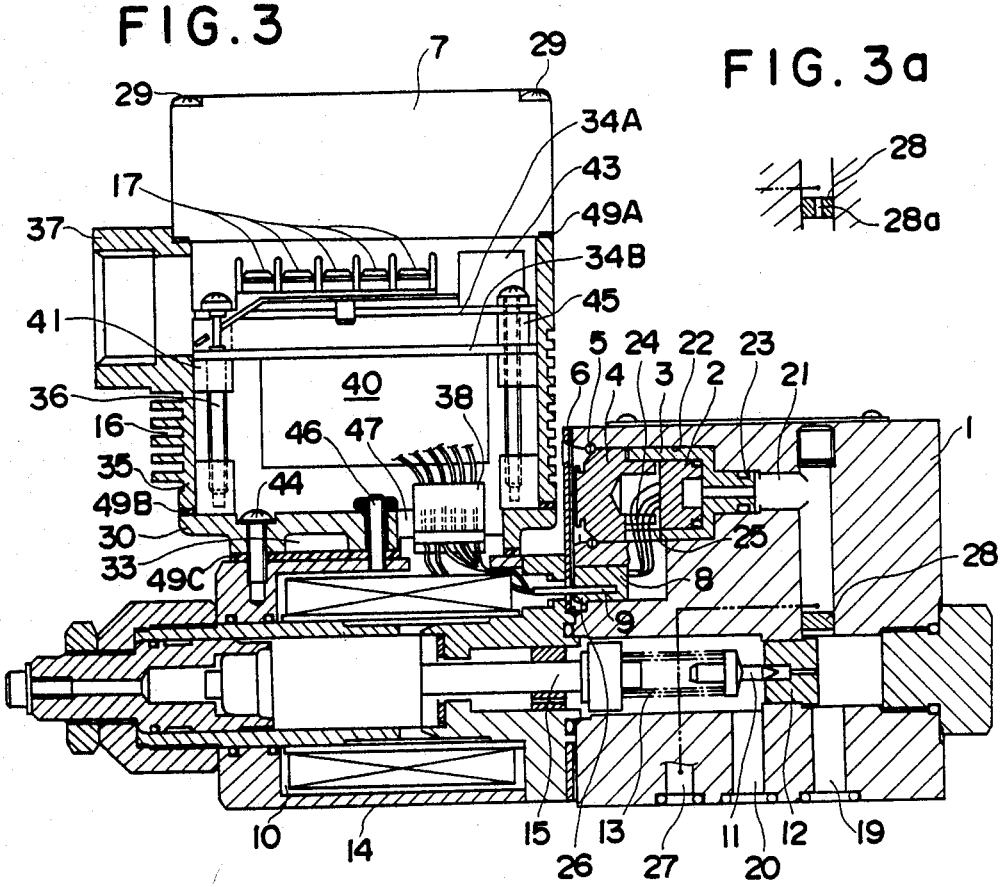
FIG. 3 is a longitudinal sectional view showing a second embodiment of the invention.
Figure 3A:
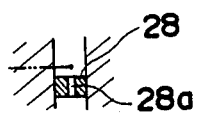
FIG. 3a shows a partial modification of the second embodiment.

FIG. 3 shows a modification of the embodiment shown in FIG. 1. In the Figure, a valve body 1 is formed with a hydraulic fluid inlet port 19, a hydraulic fluid outlet port 20 and a pressure detecting port 27 and separately formed within the valve body 1 is a pressure detecting fluid path 21 which is communicated with the pressure detecting port 27 and isolated from the hydraulic fluid inlet port 19 by a plug 28 to open to a sensor receiving hole 22. It is to be noted that in another modification the plug 28 is formed with an orifice 28a as shown in FIG. 3a. The remaining construction is the same with the embodiment of FIG. 1.

With this construction, the hydraulic fluid flowing into the hydraulic fluid inlet port 19 is set to a given pressure by the poppet 11. On the other hand, the pressure detecting port 27 provides the hydraulic pressure at the desired portion in the hydraulic circuitry so that the hydraulic pressure is delivered to the pressure sensing portion (diaphragm) of the pressure sensor 2 through the pressure detecting fluid path 21 and the strain of the gage is converted and generated as an electric signal.

For example, a closed-loop control of the control valve can be accomplished by directing the primary pressure to the pressure detecting port 27 and processing the pressure detection signal from the pressure sensor 2 by the amplifier in the box 16 and also the control valve can be easily changed to an open-loop control type by changing the specification of the amplifier within the box 16.

In accordance with the modification shown in FIG. 3, by virtue of the fact that the pressure sensor is incorporated in the valve itself and the valve is provided with its own pressure detecting port, there are effects that the system needs not be provided with any special pipe arrangement for pressure measuring purposes, that the pressure detection at the pressure controlling portion in the system is made possible by only the pressure control valve of this embodiment, that the resulting pressure detection signal can be used effectively for performing a closed-loop control of the pressure control valve, providing a pressure indication in digital form or providing various control information or fault diagnoising information, and that much greater improvements are made in respect of the occurrence of faults and the life than in cases employing the Bourdon tube type pressure gage. Also, the pressure control valve of this embodiment can be used as a balanced piston type relief valve or a pilot relief valve for a pressure reducing valve and the pilot valve of this embodiment may be applied to a relief valve through a vent line control thus similarly making the closed-loop control possible and proving effective in improving the control accuracy.

The electric equipment box 16 shown in each of FIGS. 1 and 3 contains the control amplifier to provide a so-called power amplifier and its housing construction includes some contrivances which will be described hereunder.

In the past, the power amplifier of a proportional electro-hydraulic pressure control valve has been usually used by accommodating it as an integral part in a controller which is arranged separately from the hydraulic pressure control valve side. In such a case, the power amplifier itself is frequently of the open and panel mounted type and practically no consideration is given to its water proof and dust proof properties.

Then, where such a power amplifier is mounted and used as a component of an electro-hydraulic pressure control valve, there are still many problems to be solved, such as, the limitations from the dimensional and heat dissipation point of view and the working and operating properties from the standpoints of mounting, assemblage, maintenance and inspection.

To overcome the foregoing problems, the electric equipment box 16 containing the power amplifier for the electro-hydraulic pressure control valve of this embodiment has a housing of a three-part structure including a bottom cover 30 mounted fixedly on the mounting portion of the control valve including the solenoid means 14, etc., an amplifier case 35 forming the four walls of the body portion and mounted on the bottom cover 30 for accommodating the connecting terminals 17, an amplifier main section 40, etc., and the indicator 7 serving as a detachable top cover for closing the opening in the top of amplifier case 35 as shown in FIGS. 4 to 7.

In a preferred embodiment, the amplifier case 35 is made of a heat conducting material such as an aluminum die casting and it includes a mounting portion adapted for thermal contact with the heat radiative devices of the amplifier circuit for dissipating the heat in these devices. The amplifier case 35 is also formed with radiation fins on its outer surface and the amplifier case 35 is also formed with exclusive holes 39 for the direct mounting of the amplifier devices. In a special case, the heat radiative devices directly mounted on the amplifier case 35 for heat dissipating purposes are firmly mounted on a circuit board 34A or 34B within the amplifier case 35 and in this way the circuit boards are fixedly mounted on the amplifier case 35.

The bottom cover 30 is formed on its lower surface with recesses 33 for forming an air layer between it and the control valve mounting portion. As shown in FIG. 1 or 3, the amplifier case 35 is formed therein with bracket projections 41 which are arranged at substantially the middle height to serve as a circuit board mount and the circuit boards 34A and 34B are mounted one upon another on the projections 41 through a spacer 45. Through-screws 36 are screwed through the circuit boards 34A and 34B, the spacer 45 and the projections 41 into the threaded portions of the bottom cover 30 thereby firmly holding the circuit boards 34A and 34B in place and fastening the amplifier case 35 and the bottom cover 30 together. The terminals 17, adjusting volumes 42a and 42b, a fuse 43 etc., are mounted on the circuit board 34A and the amplifier 40 including a hybrid IC, a discrete device group, etc., and a connector 38 for providing connections to the plunger means 14 of the control valve are mounted on the other circuit board 34B. The circuit boards 34A and 34B are detachably connected electrically by the connectors which are not shown.

The amplifier case 35 is for example a rectangular cylindrical case of aluminum die casting made from a material of a good heat conductivity and its outer walls are formed with a large number of radiation fins so as to increase the effective heat dissipating area and thereby make the case 35 compact in shape and excellent in heat dissipating properties. The amplifier case 35 includes holes 39 arranged at the corresponding positions (FIG. 7) so that the heat sinks of the heat generating devices, e.g., the power transistor, etc., mounted on the board 34B are screwed in place through a sealing material consisting of an adhesive material or the like and in this way the heat sinks of the heat generating devices are directly attached to the amplifier case 35 thereby concurrently fixing the circuit board 34B in place.

With the circuit boards 34A and 34B accommodated and fixed in place in this way, the amplifier case 35 lends itself to be offered as a single assembly component.

Figure 4:
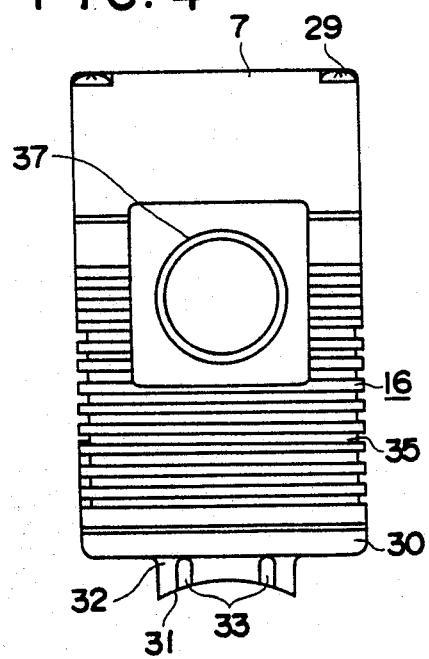
FIG. 4 is a front view showing the external view of the electric equipment box.
Figure 5:
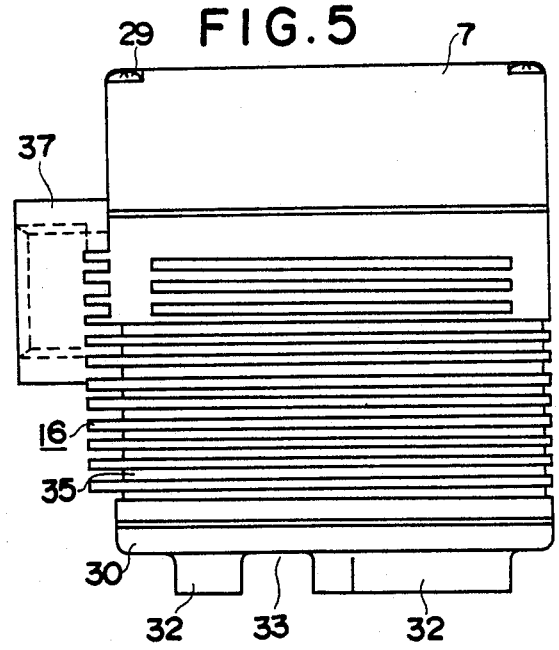
FIG. 5 is a right side view of the electric unit box.
Figure 6:
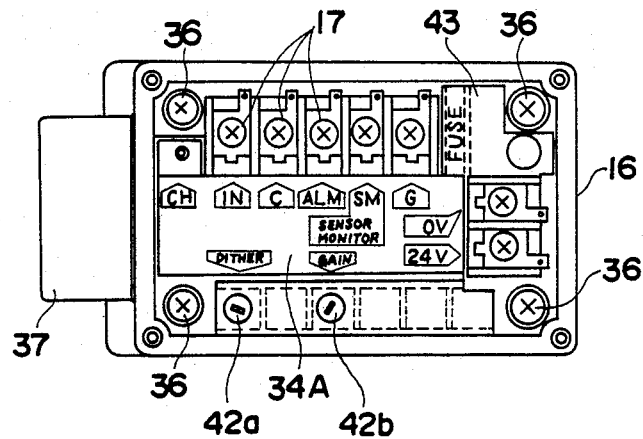
FIG. 6 is a plan view of the electric equipment box with the top cover removed to show its interior.
Figure 7:
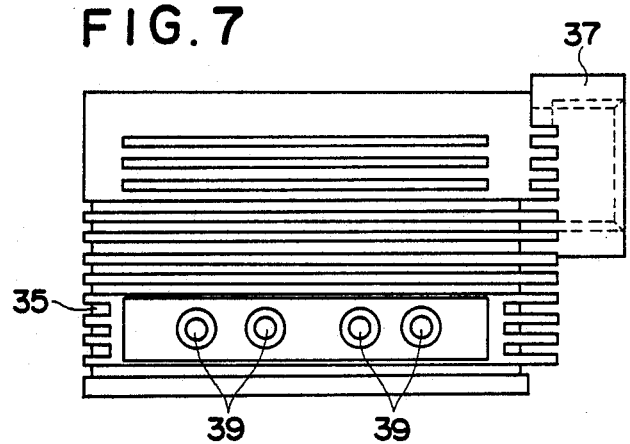
FIG. 7 is a left side view showing only the amplifier case forming the body portion of the electric equipment box.

The power amplifier of this embodiment is mounted on the curved outer surface of the plunger assembly of the proportional electro-hydraulic pressure control valve and it is made fast to the plunger means 14 by screwing the bottom cover 30 through a seal 49C as shown in FIG. 1 or 3. In this case, the screwing is effected by the use of bolts 44 screwed into the plunger means 14 from the bottom cover side and bolts 46 embedded into the plunger means 14 side. Then, as shown in FIGS. 4 and 5, the bottom cover 30 is formed on its lower surface with a saddle portion 32 having a concave curved surface 31 which conforms with the curve of the outer curved surface of the plunger means 14 and the saddle portion 32 is formed with the crosswise recesses 33 for forming a heat insulating air layer for the purpose of limiting the transmission of heat from the plunger means 14 thereby reducing the contact area between the bottom cover 30 and the plunger means 14. Also, as shown in FIGS. 1 or 3, the bottom cover 30 is formed with an opening 47 in which the connector 38 is positioned and the connector 38 is connected to the coil of the plunger means 14 in the opening 47.

In assembling, after the bottom cover 30 has been screwed to the plunger means 14, an annular seal 49B is placed over the upper surface periphery of the bottom cover 30 and the coil of the plunger means 14 is connected to the connector 38 of the amplifier case 35. Then, the amplifier case 35 is fitted on the bottom cover 30 and the amplifier case 35 is fastened, along with the circuit boards 34A and 34B, to the bottom cover 30 with the through-screws 36 as mentioned previously. As a result, the output of the power amplifier 40 is supplied to the coil of the plunger means 14 through the connector 38. In this case, as shown in FIG. 1 or 3, the screws 36 for fastening the amplifier case 35 and the bottom cover 30 together are positioned inside the amplifier case 35 and therefore they are prevented from coming out to the exterior by the placing of the top cover 7 (pressure indicator) over the amplifier case 35.

The top cover 7 is fastened to the upper part of the amplifier case 35 through an annular seal 49A by screws 29. The connection of an electric conduit to the amplifier case 35 is effected by means of a flange 37 of the case 35 which includes a conduit engaging threaded portion of a sufficient size in consideration of the drip proofness and the flange 37 is designed to have a size sufficient to permit the fitting of a water-proof connector.

The top cover 7 can be replaced by another top cover of a different construction with a considerable degree of freedom and any of various other types ranging from a simple cover to one having a digital indicating window 18 as shown in FIG. 2 can be used as a replacement part as occasion demands.

While, in this embodiment, the saddle 32 of the bottom cover 30 has its lower surface formed into a concave curved surface in conformity with the curved outer surface of the plunger means 14, the lower surface of the saddle 32 may be formed into a flat shape in cases where the plunger means 14 has flat outer surface or where the bottom cover 35 is mounted on a flat portion as when the power amplifier 40 is used as separately mounted one.

As described hereinbefore, by virtue of its housing of the three-part construction including an amplifier case having improved heat dissipating properties, the present embodiment is advantageous in that a compact power amplifier of a waterproofing and closed-type can be mounted on the upper part of plunger means of a proportional electro-hydraulic pressure control valve with the resulting saving of the space on the control panel side and that the expert knowledge is not required so much as required for the electric connection of a separately arranged amplifier thus making it possible to easily construct a proportional control valve system by simply providing the connection between a power source and a command signal source on the part of the user.

Figure 8:
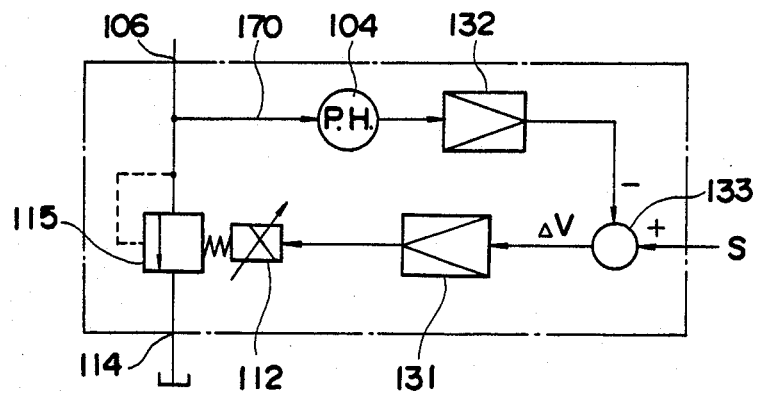
FIG. 8 is a system diagram showing a third embodiment of the invention.

Referring now to FIG. 8, there is illustrated a system diagram showing the overall construction of a proportional electro-hydraulic relief pressure control valve according to a second embodiment of the invention. In the Figure, a relief valve 115 includes proportional solenoid plunger means 112 and a pressure control section is formed between a pressure port 106 and a tank port 114 so as to control the hydraulic pressure at the pressure port 106 at a pressure proportional to the value of the input current to the solenoid means 112. A pressure sensor 104 detects the hydraulic pressure of the pressure port 106 within the valve through a pressure detecting fluid path 170 and its electric signal output is applied to the inverting input terminal of a differential amplifier 133 after its amplification by a sensor amplifier 132. The noninverting input terminal of the differential amplifier 133 receives a predetermined pressure command signal S from an external control panel (not shown), for example, and the differential amplifier 133 generates at its output terminal a signal $\Delta V$ indicative of the difference between the setting input or the command signal S and the feedback signal or the pressure detection signal. The difference signal $\Delta V$ is applied to a power amplifier 131 which in turn energizes the coil of the plunger means 112 with an output current of a value corresponding to the input.

Figure 9:
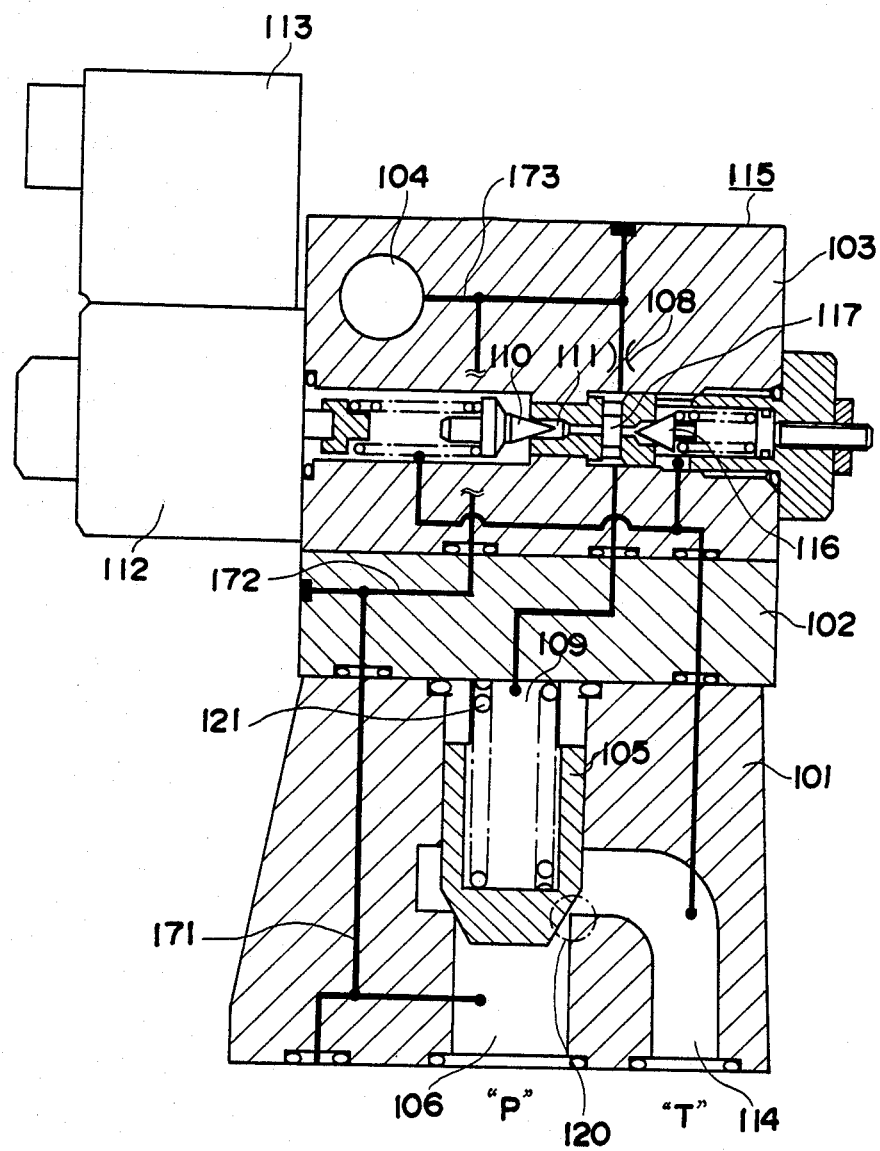
FIG. 9 is a longitudinal sectional view showing the construction of the principal part of the third embodiment.

FIG. 9 shows in greater detail the principal part of the construction shown in FIG. 8.

In FIG. 9, the valve body of the relief valve according to this embodiment includes a main body 101, an intermediate plate 102 and a pilot body 103 and these members are fastened together with through-bolts or the like which are not shown. The main body 101 includes the pressure port 106 and the tank port 114 and a main poppet 105 is seated by a spring 121 so as to form a pressure control section 120 between the ports 106 and 114. The pilot body 103 includes a pilot poppet 110, a pilot seat 111 and a safety valve 116 and the pilot poppet 110 is pressed against the pilot seat 111 under a controlled force by the proportional plunger means 112 thereby regulating the hydraulic pressure (pilot pressure) in a pilot pressure chamber 117 communicating with a spring chamber 109 of the main poppet 105. In the illustrate case, a pressure detecting fluid path is formed by a fluid passage 171 in the main body 101, a fluid passage 172 in the intermediate plate 102 and a fluid passage 173 in the pilot body 103 and the pressure sensor 104 of the semiconductor gage type is incorporated in the pilot body 103 so as to detect the hydraulic pressure in the fluid passage 173 within the pilot body 103. The primary pressure from the pressure port 106 is directed to the pressure sensing portion (diaphragm) of the pressure sensor 104 through the pressure detecting fluid passages 171 to 173 and at the same time it is directed to the pilot pressure chamber 117 through an orifice 108 to hydraulically balance the main poppet 105.

In the case of FIG. 9, the output lead wire (not shown) of the pressure sensor 104 can be led from within the pilot body 103 into an amplifier box 113 through the plunger means 112 so that the external appearance is improved as compared with a case where a pressure detection signal is introduced into the amplifier box 113 through the wiring exposed to the outside of the valve and also the occurrence of troubles such as the breaking of the wires can be prevented. Of course, the previously mentioned main amplifier 131, sensor amplifier 132, differential amplifier 133, etc., are arranged within the amplifier box 113 and it is also possible to provide various additional functions such as outputting an alarm signal from the external connection terminal when the loop difference voltage ΔV detected within the amplifier box shows an abnormal voltage value, providing a fail-safe function for unloading the rlief valve in accordance with such alarm signal and delivering through the external terminal a pressure detection signal for external control purposes.

Figure 10:
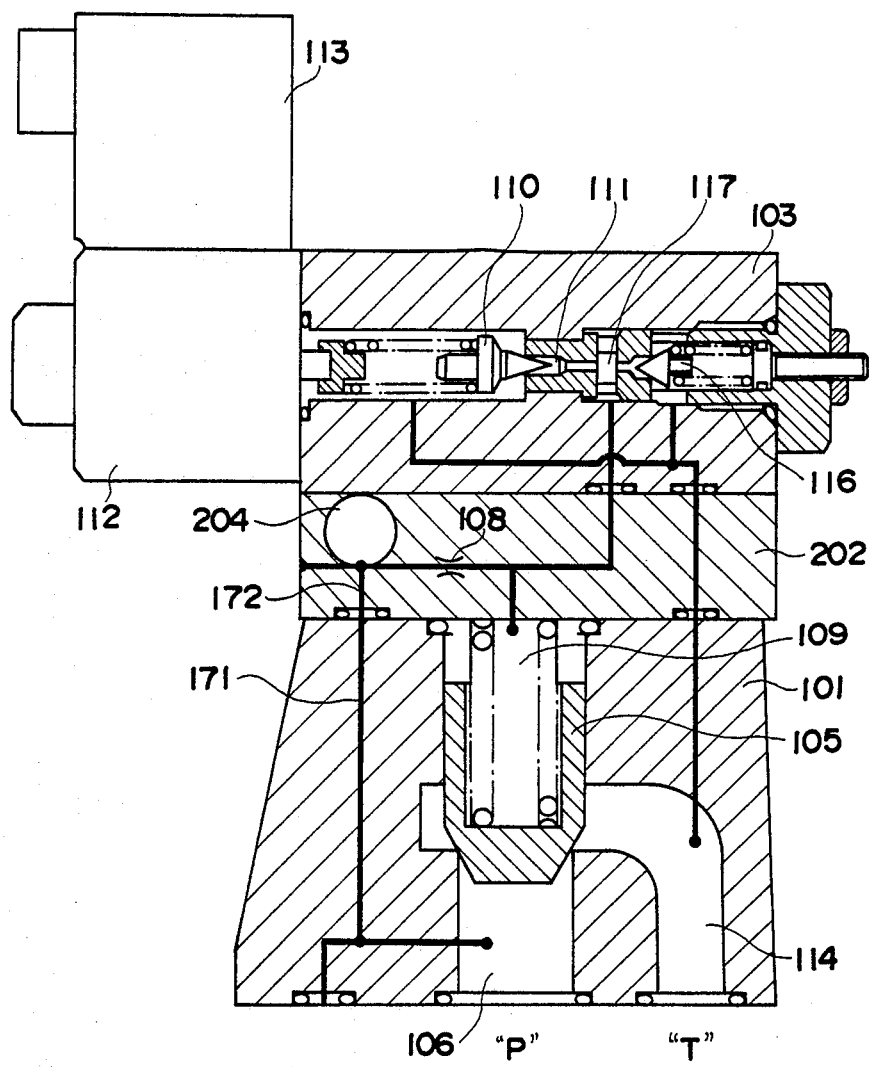
FIG. 10 is a longitudinal sectional view showing a modification of the third embodiment.

FIG. 10 shows a modification of the embodiment shown in FIG. 9 and in this modification a pressure sensor 204 is arranged inside an intermediate plate 202. The remaining construction is the same as the embodiment of FIG. 8. Thus, in accordance with this modification, by separately preparing the intermediate plate 102 (FIG. 9) including no pressure sensor, it is possible to use the same main body and pilot body in common with valves for closed-loop circuits and valves for open-loop circuits.

From the foregoing description it will be seen that in accordance with this embodiment, by virtue of the fact that a closed-loop circuit can be constructed by a valve itself, there are effects that there is no danger of complicating the construction of a hydraulic system and the control accuracy of the system can be improved easily, that the valve mounting structure can be made the same as the ordinary valves for forming open-loop circuits and hence the open-loop control system can be changed to a closed-loop control system by simply replacing the valve and that in such a case the closed-loop control system is incorporated in the valve itself thus making it possible to handle the valve without any high degree of expert knowledge.

We claim:

1. In a proportional electro-hydraulic relief valve, said relief valve comprising:
   a valve body,
   a hydraulic fluid inlet port in said valve body,
   a hydraulic fluid outlet port in said valve body,
   a pressure detecting fluid path in said valve body filled with hydraulic fluid,
   valve means arranged between said ports to control a pressure at said hydraulic fluid inlet port, and
   proportional plunger means slidably mounted in said valve body for causing application of a force proportional to an input current for setting a controlled pressure to act on said valve means,
   said valve means including a sensor holder having a pressure sensor mounted in a sensor receiving hole defined by said valve body for detecting a hydraulic fluid pressure in said pressure detecting fluid path and outputting the same as an electric signal, a pressure sensing portion of said pressure sensor being positioned so as to be exposed to said pressure detecting fluid path, said sensor holder being positioned and fixed in said valve body by a plug-and-snap assembly for preventing said pressure sensor from slipping out of position under the action for hydraulic pressure, and notches formed in said plug-and-snap assembly for accommodating signal lead wires from said pressure sensor.

2. A pressure control valve according to claim 1, wherein said pressure detecting fluid path is directly communicating with said hydraulic fluid inlet port.

3. A pressure control valve according to claim 1, wherein said pressure detecting fluid path is separated from both of said hydraulic fluid inlet port and said hydraulic fluid outlet port, and wherein a pressure detecting port communicating with said pressure detecting fluid path is provided in said valve body.

4. A pressure control valve according to claim 1, wherein said pressure detecting fluid path is communicated with said hydraulic fluid inlet port with an opening limited by an orifice, and wherein a pressure detecting port communicating with said pressure detecting fluid path is provided in said valve body.

5. A pressure control valve according to claim 1, wherein said pressure sensor comprises a semiconductor gage type pressure sensor.

6. A pressure control valve according to claim 1, further comprising a power amplifier for controlling an input current to said plunger means.

7. A pressure control valve according to claim 6, further comprising a feedback circuit for comparing an output signal of said pressure sensor with an externally applied command signal to generate a difference signal and applying said difference signal as a feedback signal to said power amplifier.

8. A pressure control valve according to claim 6, further comprising an electric equipment box accommodating said power amplifier.

9. A pressure control valve according to claim 8, wherein said electric equipment box comprises a housing of a three-part structure including a bottom cover attached to mounting component parts including said plunger means, an amplifier case fixedly mounted on said bottom cover to form body walls, and a detachable top cover for closing a top opening of said amplifier case.

10. A pressure control valve according to claim 9, wherein a recess is formed on a lower surface of said bottom cover to form a layer of air between said lower surface and said mounting component parts.

11. A pressure control valve according to claim 9, wherein said top cover includes a pressure indicator.

12. A pressure control valve according to claim 9, wherein said amplifier case is formed with radiation fins.

13. A pressure control valve according to claim 9, wherein said amplifier case is made of a heat conducting material and including a portion contacting thermally with a heat radiative device of an amplifier circuit for dissipation of heat from said heat radiative device.

14. A pressure control valve according to claim 13, wherein said amplifier case is formed with a hole exclusively used for direct mounting of said heat radiative device.

15. A pressure control valve according to claim 13, wherein said heat radiative device directly mounted on said amplifier case for heat dissipation is fixedly mounted on a circuit board within said amplifier case whereby said circuit board is fastened to said amplifier case.

* * * * *